(No Model.)

2 Sheets—Sheet 1.

J. T. EDEN.
WIND WHEEL.

No. 330,304.　　　　Patented Nov. 10, 1885.

Witnesses.　　　　Inventor
Saml R. Turner　　　John T. Eden
P. B. Turpin　　　By R. S. & A. P. Lacey
　　　　　　　　　　　Attys.

(No Model.)
J. T. EDEN.
WIND WHEEL.
No. 330,304.
2 Sheets—Sheet 2.
Patented Nov. 10, 1885.
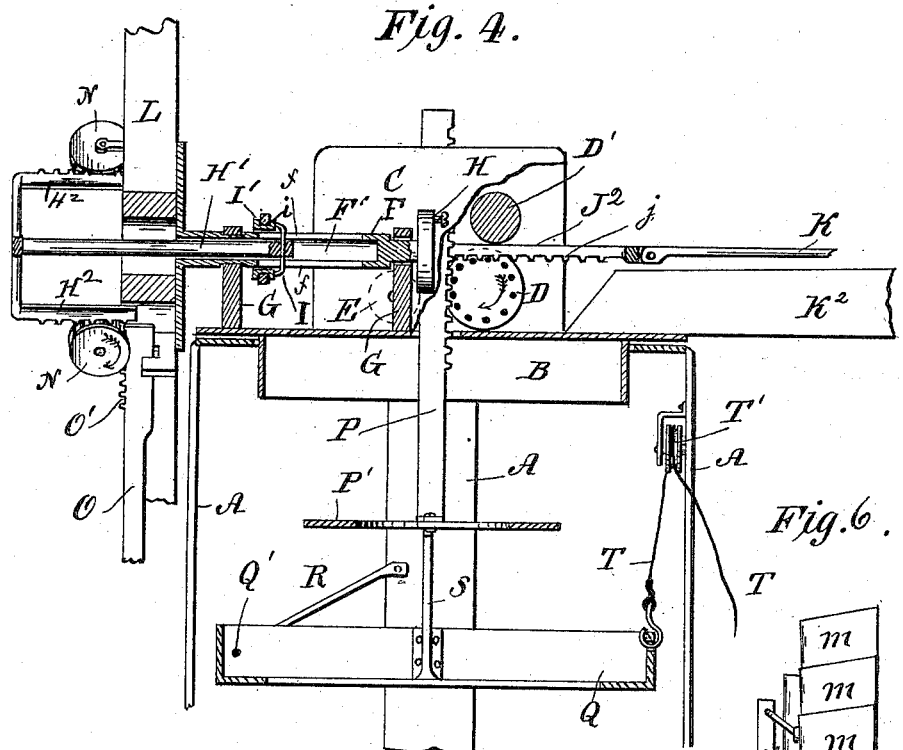
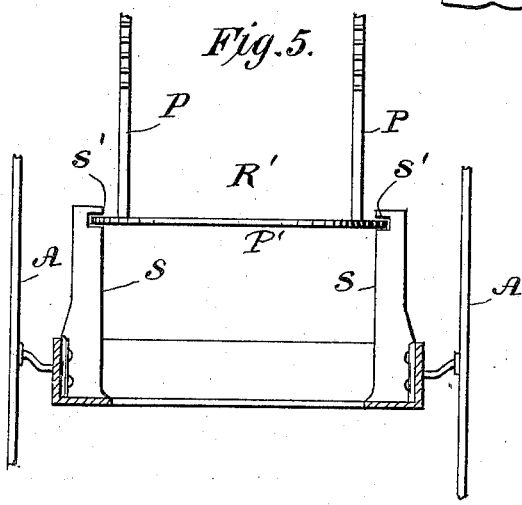
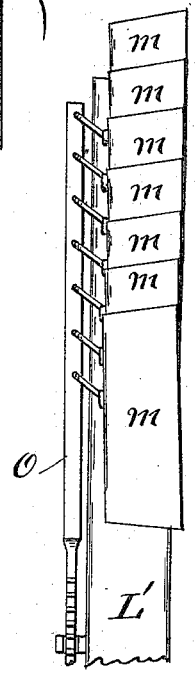
Witnesses.
Saml R. Turner
P. B. Turpin
Inventor
John T. Eden
By R. S. & A. P. Lacey
Attys
N. PETERS. Photo-Lithographer, Washington, D. C.

UNITED STATES PATENT OFFICE.

JOHN T. EDEN, OF ODELL, NEBRASKA.

WIND-WHEEL.

SPECIFICATION forming part of Letters Patent No. 330,304, dated November 10, 1885.

Application filed March 5, 1885. Serial No. 157,779. (No model.)

*To all whom it may concern:*

Be it known that I, JOHN T. EDEN, a citizen of the United States, residing at Odell, in the county of Gage and State of Nebraska, have invented certain new and useful Improvements in Wind-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to wind-wheels; and it consists in the novel construction and combination of parts, whereby the force of the wind tends in a gale to adjust the sails out of the wind in order to prevent damage to the wheel and framing.

Figure 1:
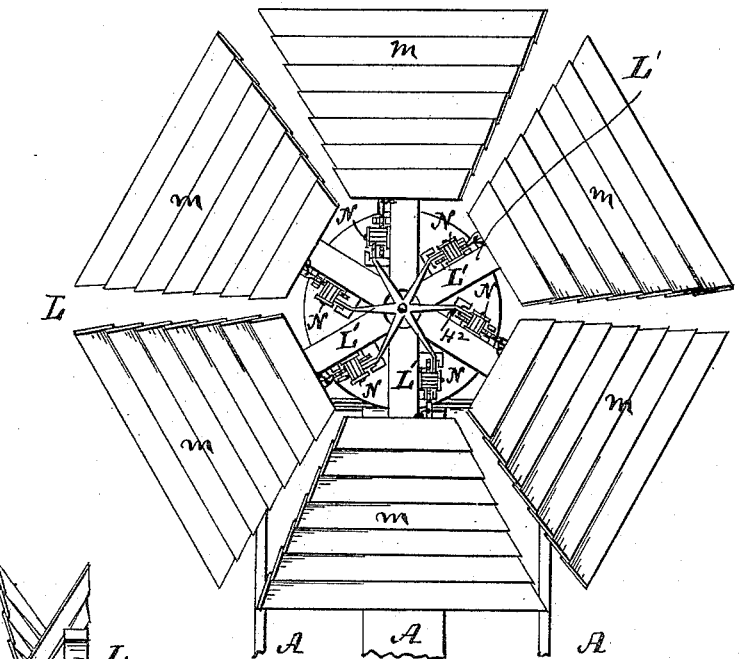
Figure 2:
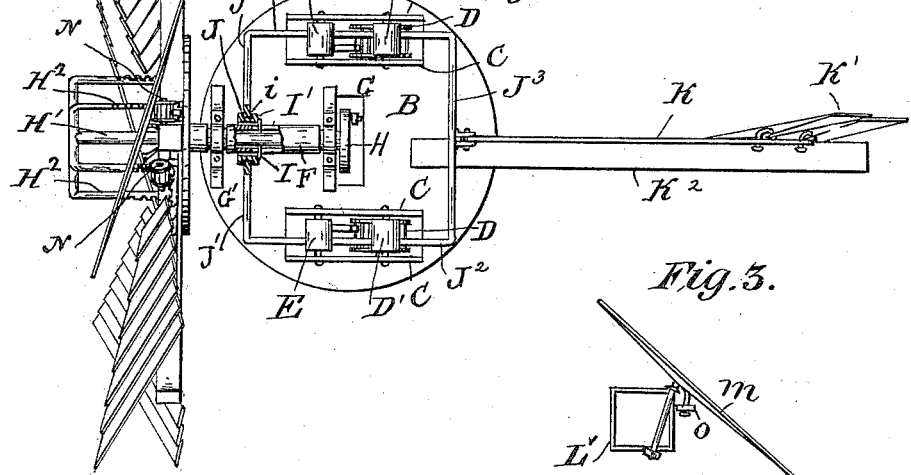
Figure 3:
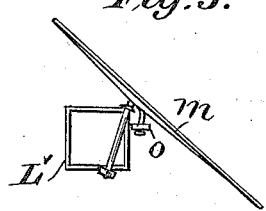

Referring to the drawings, Figure 1 is a front view, and Fig. 2 a plan view, of my machine. Fig. 3 is a detail view of one of the spokes or arms and a sail thereon. Fig. 4 is a vertical longitudinal section of the upper part of the frame and a portion of the wheel. Fig. 5 is a detached sectional view illustrating the manner of supporting the counter-balance, and Fig. 6 is a detail front view of one of the spokes with its sails adjusted out of the wind.

In carrying out my invention I employ a tower or support, A, and a turn-table, B, journaled in the upper end of said tower, as shown. On this turn-table, near two of its opposite edges, I mount journal-frames C, in which to support toothed wheels and anti-friction rollers. The toothed wheels D D are journaled close to the upper side of the turn-table, and anti-friction rollers D' D' are journaled above the wheels D and a sufficient distance therefrom to permit the easy movement between them of the rack-bars, presently described. The rollers D' D' serve to hold said rack-bars in proper gear with the wheels D D, as most clearly shown in Fig. 4. In advance of the rollers D' D', I usually arrange anti-friction rollers E E, arranged to bear on the top side of the vertical rack-bars, presently described.

The shaft F is journaled in suitable supports, G, mounted on the turn-table. This shaft is provided at its inner end, centrally over the turn-table, with a crank, H, or other expedient by which its revolutions may be transmitted to a pump rod or pitman, by which to connect it with the machine it is desired to operate. This shaft is made hollow from its outer end, as shown at F', and it is provided with longitudinal slots $f$, near its inner end, in which slide the pins or arms which connect the sliding rod with its sleeve. This sliding-rod H' operates through the hollow shaft and has at its inner ends arms I, which are connected with the sleeve I', encircling the shaft F. This sleeve I' is provided with an annular groove, $i$. A collar, J, is seated in this groove $i$ of the sleeve I', and has fixed to it arms or rods J', which extend outward a short distance at right angles to the sliding rod H, and are bent back parallel to the sliding rod, as shown most clearly in Fig. 2, so as to provide the rack-bars $J^2$. The bars $J^2$ operate between the wheels D and rollers D', and have teeth $j$, which are geared with the teeth of the wheels D. The bars $J^2$ are connected at their rear ends by a cross-bar, $J^3$, to which, between its ends, is secured the vane-rod K. This vane-rod extends back and connects with a vane plate or plates, K', which are pivoted between their ends. The connection of the rod K with the plates K' is eccentric to the pivot of said plates, so that when the rod K is pushed rearwardly it will operate to adjust the vane-plates out of the wind by moving such plates into line with their support $k^2$.

The wheel L is secured on the outer end of the shaft F, and has arms L', to which are attached the sails M. These sails are pivoted between their ends to the arms or spokes L', at one corner of the spokes, in such manner that when adjusted at right angles to the spokes, as shown in Figs. 1 and 2, the said sails will rest at an incline to the plane of the wheel, so the wind striking against such sails will effect a revolution of the wheel. When the sails are in line with the spokes, they will lie close to the outer face of the spokes L' and be out of the wind. In order that the sails may automatically assume a position out of the wind, I form them with one arm or side heavier than the other. This is usually accomplished by pivoting the sails eccentrically between their ends, as shown in Fig. 3, but may be secured by weighting one end of the sails, as will be manifest. By thus weighting one end of the sails they will move by centrifugal force outward, and this outward tendency will be increased with the rapidity of the revolution of the wheel. In order to prevent the weight of the sails from constantly holding said sails out of the wind, and also to provide means by which to throw such sails into the wind when the force thereof decreases, I provide the mechanism which I will now describe. On the wheel I journal toothed wheels or pinions N. Connecting-bars O are secured at one end to one of the arms of the sails, and have their inner ends provided with rack-teeth O', meshed with the pinion N.

The sliding rod H' extends outward beyond the wheel, and is provided with branches H², which are also provided with rack-teeth, and are geared with the toothed pinion N. It is preferred to employ a toothed pinion, connecting-rod, and branch H² for each spoke of the wheel; but manifestly a single one of each of said parts might be employed without departing from the principles of the invention.

The operation will be best understood on reference to Fig. 4. In this figure it will be noticed as the rod O is drawn outward it will revolve the tooth-pinion N in the direction indicated by the arrow. This will force the sliding rod H', together with its bars J², inward. The bars J² will cause the wheels D to revolve, as indicated by the arrow. With these wheels D are meshed bars P, having their upper ends racked to properly engage the wheels D, and held in contact with such wheels by a roller, E, journaled in front of the wheel D, as shown in Figs. 2 and 4. On the lower ends of bars P, I secure a circular plate, P', having a central opening for the passage and operation of the pump-rod.

A counter-balance, Q, is located below the plate P, and pivoted at one end at Q' to a suitable support, R. This counter-balance may be made of sufficient weight to properly counteract the tendency of the sails ordinarily to assume a position out of the wind, or it may be supplied with removable weights, as desired. It is provided with a central opening, like the plate P', to permit the operation of the pump-rod, and has fixed to its opposite sides uprights S, having in their upper ends slots S', which fit over the opposite sides of the plate P. By this construction a counter-balance is suspended on the plate P', and the revolution of such plate is not affected. To the end of the counterbalance opposite its pivot Q', I secure a rope or chain, T, which extends up over a pulley, T', and thence down in convenient reach of the operator.

The operation will be fully understood from the description before given in connection with the drawings.

Referring to Fig. 4, it will be seen that when the centrifugal force is of sufficient strength to overcome the counter-balance Q the rod O will be moved outward, turning the pinion N, which will move the sliding rod H inward, revolving the wheel D and elevating the counter-balance.

It will be seen that by drawing on the cord T the counter-balance will be raised, forcing the bars P upward, and turning the wheels D in such manner, through the connection described, as to throw the sail out of the wind. For this reason I prefer to employ the construction for supporting the counter-balance shown; but it is manifest that the said counter-balance might be supported on a rope or chain wound on the wheels D or a drum affixed thereto.

It will also be understood that the elevation of the counter-balance might be effected by connecting the bars J² with the wheels D by a cord secured to the bar J² and passed around and fixed to the wheel D instead of the rack and gear connection shown; but the latter is preferred, because by it the wheel may be automatically thrown out of the wind, or may be adjusted out of the wind, at the will of the operator.

My invention, it will be seen, enables the setting of a wheel close to the tower, greatly strengthening its position, and obviating the breaking of the axle or shaft, frequently experienced when the wheel is set at a distance from the tower.

Having thus described my invention, what I claim, and desire to secure by Letters Patent, is—

1. The combination, in a windmill, of the sails pivoted between their ends, and having one end or arm heavier than the other, the vane-plates pivoted to the vane-rod, a counter-balance, and connections between the counter-balance, the sails and vane-plates, whereby an outward movement of the heavy arm by centrifugal force will effect an elevation of the counter-balance, substantially as set forth.

2. The combination of the hollow-shaft, the wheel secured on the shaft, and having its sails pivoted between their ends, and made heavier at one end than the other, a toothed pinion journaled to the wind-wheel, bars secured to the sails and having rack-teeth geared with the toothed pinion, a sliding rod operating through the hollow shaft, and provided at its outer end with rack-teeth geared with the toothed pinion, wheels on the framing geared with the sliding rod, a counter-balance, and the wheels on the framing, substantially as set forth.

3. The combination of the pivoted sails having one arm heavier than the other, the bar secured to such sails, and having rack-teeth on its inner portion, a pinion journaled on the wheel and meshed by the rack-bar, the sliding rod, a toothed wheel on the framing geared with said rod, a counter-balance, and a rack bar or bars secured to the counter-balance and geared with the toothed wheel on the framing, substantially as set forth.

4. The combination of the wind-wheel having the pivoted sails, the toothed pinion journaled on the wheel, the bar secured to the sails and having rack-teeth geared with the toothed pinion, the sliding bar having racks geared with the toothed pinion, the wheels D, journaled on the framing of the mill and connected with the inner end of the sliding rod, the bars P, connected with the wheels D, and having the plate P' on their lower ends, and the counter-balance, having uprights S, provided near their upper ends with slots S', fitted over the edge of the plate P', substantially as set forth.

5. The combination of the wind-wheel, the wheel D, the rods $J^2$, connected with the sails of the wind-wheel and geared with such wheels D, the bars P, connected with the wheels D and having a plate, P', the counter-balance Q, having uprights S, formed with slots S', fitted over the plate P', and the cord T, substantially as set forth.

In testimony whereof I affix my signature in presence of two witnesses.

JOHN T. EDEN.

Witnesses:
E. B. HINDS,
D. E. MAYER.